Oct. 31, 1939.         G. ADAMEC         2,178,028
PARING KNIFE
Filed Dec. 29, 1937
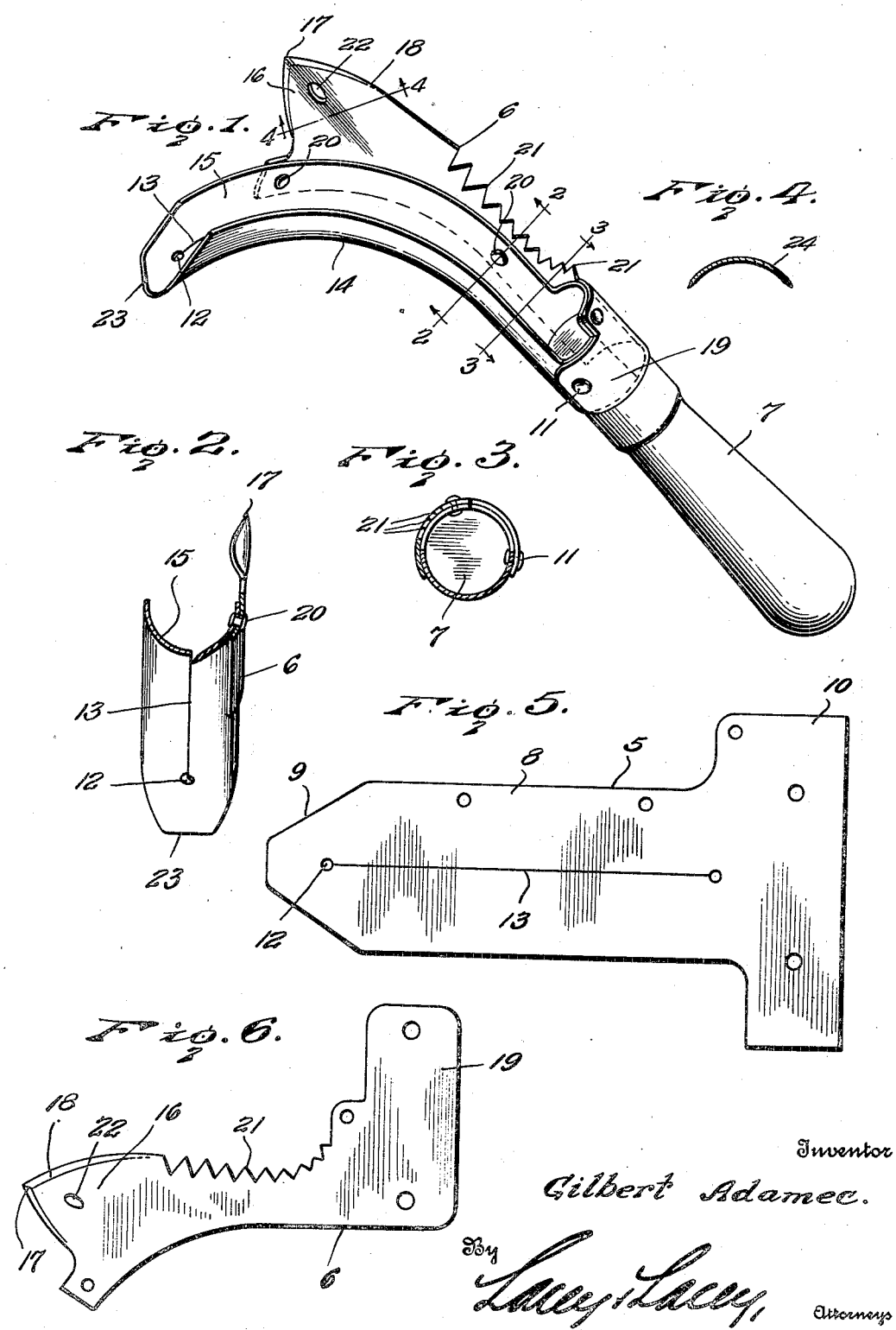
Inventor
Gilbert Adamec.
By Lacy & Lacy,
Attorneys Patented Oct. 31, 1939

2,178,028

UNITED STATES PATENT OFFICE 2,178,028

PARING KNIFE

Gilbert Adamec, New York, N. Y.

Application December 29, 1937, Serial No. 182,320

2 Claims. (Cl. 30—279)

This invention relates to paring knives and has for its object to provide a comparatively simple and inexpensive device of this character, by means of which the peeling of potatoes and other vegetables or fruits may be effected with greater facility and more expeditiously than heretofore.

A further object of the invention is to provide a paring knife, the cutting edge of which is in the form of an irregular curve to permit the use thereof on potatoes and other vegetables of different sizes and shapes, the construction of the device being such as to remove the skin of a potato in a thin layer without liability of gouging into the meat of the potato and causing a needless waste of the edible portion thereof.

A further object is to provide a paring knife having a lateral spur or projection for removing eyes or decayed portions from a potato, said knife being provided adjacent the eye-removing spur with a plurality of teeth or serrations of different sizes for scraping carrots, turnips and other vegetables or fruits.

A further object is to provide a paring knife including a supporting handle having potato-engaging elements mounted thereon and each provided with a securing tongue adapted to fit around the adjacent end of the supporting handle in overlapped relation for securing said elements in position thereon.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a perspective view of a paring knife embodying the present invention, Figure 2 is a transverse sectional view taken on the line 2—2 of Figure 1 and looking in the direction of the arrows, Figure 3 is a similar view taken on the line 3—3 of Figure 1, Figure 4 is a transverse sectional view taken on the line 4—4 of Figure 1, Figure 5 is a plan view of the blank constituting the cutting element, and Figure 6 is a similar view of the blank constituting the eye remover and scraping device.

The improved paring knife forming the subject-matter of the present invention comprises a cutting element 5 and a combined eye-removing and scraping element 6, said elements being secured in position on an operating handle 7. The cutting element 5 is formed from a blank of the construction shown in Figure 5 of the drawing and comprises an elongated body portion 8 having one end thereof tapered at 9 and its other end provided with oppositely disposed reduced securing tongues 10 adapted to be bent around the adjacent end of the supporting handle 7 and to which they are secured by nails, screws or similar fastening devices 11. The body portion 8 is formed with spaced openings 12 and the metal between said openings is cut or severed and pressed laterally to form a cutting edge 13. After the blank constituting the cutting element is formed, the metal is bent or rolled to form a longitudinally concavo-convex member 14 defining a trough 15 which is U-shaped in cross section and curved longitudinally and opens through the upper edge of the knife, as shown. The longitudinal curvature of the member 14 is preferably in the form of an irregular or "French" curve so as to permit the device to be used for paring potatoes of different sizes and shapes while the cutting edge 13 is disposed on the transversely convex underface of the member 14 so that, as the knife is moved over the surface of a potato, the skin will be readily removed therefrom in thin layers without liability of gouging into the meat of the potato and causing a needless waste of the edible portion thereof. The combined eye-removing and scraping element 6 is formed from a blank of the construction shown in Figure 6 of the drawing, one end of the blank being provided with a lateral spur or projection 16 terminating in a piercing point 17 and having its edges adjacent the point 17 sharpened, as indicated at 18. The other end of the blank is provided with a lateral attaching tongue 19 adapted to be bent or curved around the handle 7 in overlapped relation to the adjacent tongue 10 and to which handle it is secured by the fastening devices 11. By so forming and securing the rear end of the scraper 6, it will be firmly secured and in addition serve as a reinforcement for the rear end portion of the cutter 5. The blank constituting the eye-removing and scraping element is secured along one side of the trough 15 in any suitable manner, as by rivets 20, and formed in the edge of said element at the rear of the eye-removing spur 16 are a plurality of teeth or serrations 21 which gradually decrease in size as they approach the handle 7 so as to permit the device to be used for scraping carrots, turnips and other vegetables or fruit. It will here be noted that the smaller teeth 21 are disposed on an inwardly curved line extending in the direction of the handle to accommodate relatively small vegetables when scraping the same. An opening 22 is formed in the central portion of the eye-removing spur 16 to permit the knife to be readily suspended from a nail or other suitable support when not in use. The spur 16 is spaced inwardly from the outer end of the member 14 so as to permit the spur to be conveniently used for removing eyes or decayed portions from a potato while the tapered end of the spur is preferably curved in cross section, as indicated at 24 in Figure 4 of the drawing, to facilitate cutting into the potato when the spur is turned or partially turned to effect the removal of an eye or decayed portion.

In using the device, the operator grasps the handle 7 and moves the irregularly curved portion of the member 14 over the surface of the potato in a well known manner. Inasmuch as said member 14 is in the form of a longitudinally extending irregular curve, the cutting edge 13 thereof may be disposed to engage the maximum amount of the circumference of any size potato and said cutting edge will remove the skin of the potato in relatively thin layers without liability of gouging into the meat of the potato and causing a needless waste of the edible portion thereof. By positioning the spur 16 within the eye of a potato or thrusting it into a decayed portion thereof and then partially turning the knife, the eye or decayed portion will be readily removed.

In using the device for scraping vegetables, the teeth 21 are pressed into the vegetable and a lateral movement imparted to the knife, as will be readily understood. In scraping relatively small vegetables, such as carrots or the like, the carrot is positioned opposite the small teeth or serrations and the knife drawn laterally across the carrot, as before stated. The peelings from the potatoes and the scraped meat of the vegetables produced by the teeth 21 will fall into the trough 15 and thence be directed outwardly into a bucket or other receptacle designed to receive the same.

It will, of course, be understood that the devices may be made in different sizes and that the eye-removing spur and serrations may be disposed on either side of the element 14 without departing from the spirit of the invention. It will also be understood that, if desired, the eye-removing spur and serrations may be stamped or otherwise formed integral with the cutting element 14 and that the devices may be nickeled, galvanized or otherwise coated to give them a neat attractive appearance.

A paring knife constructed in accordance with the present invention will not only facilitate and expedite paring of potatoes and other vegetables but will also effect a material saving in the edible portion of the vegetables as liability of needles gouging or cutting away of the potato is effectually prevented.

Having thus described the invention, what is claimed as new is:

1. A device of the class described comprising a supporting handle, a cutting implement secured at its rear end about the front end of the supporting handle and extending longitudinally therefrom in an irregular curve, a plate secured along one side edge of the cutting implement and having its front end fashioned to form an eye-removing spur and its rear end formed with an attaching tongue curved inwardly for engagement with the handle engaging portion of the cutting implement, that portion of the plate between the spur and attaching tongue being formed with serrations, certain of the serrations being smaller than others and extended along the inwardly extending portion of the plate in the direction of the supporting handle.

2. A device of the class described comprising a supporting handle, a cutting element formed from a blank having one end thereof provided with laterally extending attaching tongues disposed in overlapped relation to each other and together with the said end portion of the cutting element forming a sleeve for engaging about said handle, and a combined eye-removing spur and scraping member formed from a blank, one edge of which is secured along the adjacent side edge of the cutting implement, said blank being formed with serrations and provided with a lateral tongue adapted to fit snugly around the sleeve of the cutting implement in overlapped relation to the tongues thereof and reinforce the cutting implement.

GILBERT ADAMEC.